(12) United States Patent
Goray et al.

(10) Patent No.: US 6,636,840 B1
(45) Date of Patent: Oct. 21, 2003

(54) COMPUTER SYSTEM CONFIGURED IN SUPPORT OF SOLVING NP-COMPLETE PROBLEMS AT HIGH SPEED

(75) Inventors: Ivan Ivanovich Goray, St. Petersburg (RU); Leonid Ivanovich Goray, St. Petersburg (RU)

(73) Assignee: International Intellectual Group, Inc., Penfield, NY (US)

(*) Notice: Subject to any disclaimer, the term of this patent is extended or adjusted under 35 U.S.C. 154(b) by 0 days.

(21) Appl. No.: 09/420,982

(22) Filed: Oct. 20, 1999

Related U.S. Application Data

(63) Continuation-in-part of application No. 09/006,367, filed on Jan. 13, 1998, now abandoned.

(51) Int. Cl.[7] .............................................. G06F 15/18
(52) U.S. Cl. ............................. 706/12; 706/11; 706/14
(58) Field of Search ................................ 706/11, 12, 14

(56) References Cited

U.S. PATENT DOCUMENTS 5,943,652 A * 8/1999 Sisley et al. ................... 705/9

OTHER PUBLICATIONS

Christopher Umans et al; Hamiltonian Cycles in Solid Grid Graphs; Oct. 20, 1997; IEEE; 0272-5428/97; 496-505.*

John Franco; The brick wall: NP-completeness; Oct. 1997; IEEE; 0278-6648/97; 37-40.*

* cited by examiner

*Primary Examiner*—Paul P. Gordon
*Assistant Examiner*—Joseph P. Hirl
(74) *Attorney, Agent, or Firm*—Wall Marjama & Balinski LLP

(57) ABSTRACT

The present invention is a computer system and associated method configured to in support of solving NP-complete problems such as minimal Hamiltonian cycle type problems. According to the invention, a primary network represented by the matrix of its edges is recorded in the memory space, and an equivalent representation of the primary network is formed as a set of subnetworks. Nodes of a present path are reordered according to a set of reordering rules and edge weights of edges of the set of subnetworks are changed according to a set of edge weight changing rules.

48 Claims, 17 Drawing Sheets

· · ·

| WEIGHTS | SUBNETWORKS | | | | | |
|---|---|---|---|---|---|---|
| | 1 | 2 | 3 | 4 | 5 | 6 |
| $C_{12}$ | 0 | 0 | -20 | -46 | 6 | -52 |
| $C_{13}$ | 0 | -38 | 0 | -106 | 15 | -76 |
| $C_{14}$ | 0 | 18 | -24 | 0 | 39 | -66 |
| $C_{15}$ | 0 | -42 | -15 | -73 | 0 | -76 |
| $C_{16}$ | 0 | -2 | -8 | -80 | 22 | 0 |
| $C_{23}$ | -54 | 0 | 0 | -50 | 11 | -40 |
| $C_{24}$ | -110 | 0 | -80 | 0 | -21 | -86 |
| $C_{25}$ | -50 | 0 | -11 | -13 | 0 | -36 |
| $C_{26}$ | -90 | 0 | -44 | -60 | -18 | 0 |
| $C_{34}$ | -50 | 22 | 0 | 0 | 48 | -50 |
| $C_{35}$ | -59 | -47 | 0 | -82 | 0 | -69 |
| $C_{36}$ | -66 | -14 | 0 | -96 | 15 | 0 |
| $C_{45}$ | -83 | -15 | -48 | 0 | 0 | -83 |
| $C_{46}$ | -76 | 32 | -34 | 0 | 29 | 0 |
| $C_{56}$ | -66 | -18 | -15 | -63 | 0 | 0 |
FIG. 8A
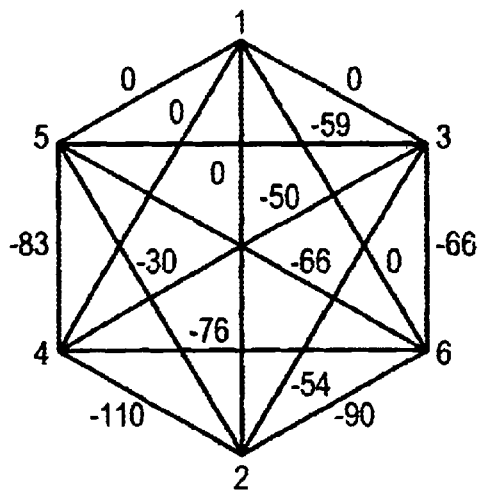
FIG. 8B
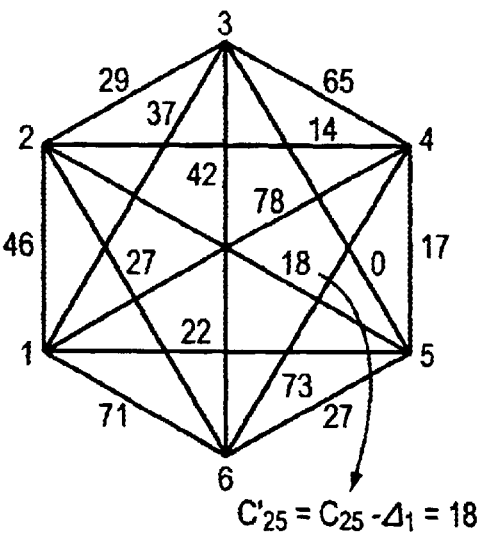
$C'_{25} = C_{25} - \Delta_1 = 18$
FIG. 8C

| WEIGHTS | SUBNETWORKS | | | | | |
|---|---|---|---|---|---|---|
| | 1 | 2 | 3 | 4 | 5 | 6 |
| $C_{12}$ | 0 | 0 | -15 | -46 | 15 | -69 |
| $C_{13}$ | 0 | 15 | 0 | -49 | 15 | -69 |
| $C_{14}$ | 0 | 18 | -15 | 0 | 15 | -69 |
| $C_{15}$ | 0 | 15 | -15 | -49 | 0 | -69 |
| $C_{16}$ | 0 | 15 | -15 | -49 | 15 | 0 |
| $C_{23}$ | -59 | 0 | 0 | -46 | 15 | -69 |
| $C_{24}$ | -62 | 0 | -18 | 0 | 12 | -72 |
| $C_{25}$ | -59 | 0 | -15 | -46 | 0 | -69 |
| $C_{26}$ | -59 | 0 | -15 | -46 | 15 | 0 |
| $C_{34}$ | -59 | 18 | 0 | 0 | 15 | -69 |
| $C_{35}$ | -59 | 15 | 0 | -49 | 0 | -96 |
| $C_{36}$ | -59 | 15 | 0 | -49 | 15 | 0 |
| $C_{45}$ | -59 | 18 | -15 | 0 | 0 | -69 |
| $C_{46}$ | -59 | 18 | -15 | 0 | 15 | 0 |
| $C_{56}$ | -59 | 15 | -15 | -49 | 0 | 0 |

| | | | | | | | | | | | | | |
|---|---|---|---|---|---|---|---|---|---|---|---|---|---|
| 0 | 290 | 840 | 230 | 1573 | 1273 | 1348 | 2114 | 141 | 2382 | 507 | 1590 | 713 | 513 | 120 |
| 0 | 0 | 568 | 503 | 1346 | 1016 | 1337 | 2065 | 366 | 2298 | 281 | 1499 | 425 | 356 | 389 |
| 0 | 0 | 0 | 1066 | 819 | 456 | 1246 | 1833 | 933 | 1989 | 354 | 1278 | 194 | 437 | 951 |
| 0 | 0 | 0 | 0 | 1803 | 1503 | 1500 | 2277 | 149 | 2561 | 737 | 1778 | 928 | 740 | 114 |
| 0 | 0 | 0 | 0 | 0 | 394 | 1154 | 1366 | 1693 | 1385 | 1073 | 846 | 1013 | 1065 | 1693 |
| 0 | 0 | 0 | 0 | 0 | 0 | 1240 | 1641 | 1378 | 1720 | 767 | 1059 | 641 | 798 | 1389 |
| 0 | 0 | 0 | 0 | 0 | 0 | 0 | 780 | 1486 | 1091 | 1130 | 441 | 1361 | 1005 | 1441 |
| 0 | 0 | 0 | 0 | 0 | 0 | 0 | 0 | 2254 | 359 | 1823 | 604 | 1991 | 1714 | 2213 |
| 0 | 0 | 0 | 0 | 0 | 0 | 0 | 0 | 0 | 2523 | 620 | 1731 | 787 | 642 | 65 |
| 0 | 0 | 0 | 0 | 0 | 0 | 0 | 0 | 0 | 0 | 2038 | 799 | 2164 | 1942 | 2487 |
| 0 | 0 | 0 | 0 | 0 | 0 | 0 | 0 | 0 | 0 | 0 | 1241 | 305 | 133 | 624 |
| 0 | 0 | 0 | 0 | 0 | 0 | 0 | 0 | 0 | 0 | 0 | 0 | 1390 | 1143 | 1698 |
| 0 | 0 | 0 | 0 | 0 | 0 | 0 | 0 | 0 | 0 | 0 | 0 | 0 | 428 | 814 |
| 0 | 0 | 0 | 0 | 0 | 0 | 0 | 0 | 0 | 0 | 0 | 0 | 0 | 0 | 633 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

(TO FIG. 11B)

FIG. 11A $$\begin{bmatrix}
1624 & 1013 & 257 & 658 & 225 & 85 & 1878 & 4939 & 672 & 1143 & 1001 & 2759 & 596 \\
1517 & 916 & 53 & 456 & 92 & 276 & 1858 & 4855 & 518 & 893 & 843 & 2845 & 539 \\
1211 & 738 & 617 & 307 & 615 & 843 & 1693 & 4492 & 426 & 349 & 549 & 2839 & 624 \\
1820 & 1213 & 460 & 888 & 451 & 228 & 2028 & 5110 & 895 & 1373 & 1220 & 2826 & 796 \\
769 & 814 & 1399 & 915 & 1364 & 1601 & 1358 & 3746 & 925 & 470 & 653 & 2590 & 1092 \\
1007 & 777 & 1067 & 640 & 1052 & 1286 & 1572 & 4135 & 698 & 139 & 559 & 2790 & 900 \\
533 & 508 & 1375 & 1004 & 1276 & 1425 & 530 & 3612 & 881 & 1148 & 720 & 1593 & 797 \\
636 & 1155 & 2109 & 1668 & 2017 & 2188 & 288 & 2833 & 1564 & 1608 & 1295 & 1277 & 1536 \\
1765 & 1154 & 319 & 781 & 329 & 92 & 2016 & 5080 & 805 & 1252 & 1136 & 2874 & 737 \\
788 & 1383 & 2346 & 1871 & 2261 & 2450 & 645 & 2559 & 1782 & 1716 & 1480 & 1474 & 1789 \\
1252 & 668 & 334 & 175 & 291 & 527 & 1634 & 4589 & 259 & 636 & 568 & 2689 & 363 \\
96 & 584 & 1546 & 1078 & 1462 & 1655 & 518 & 3358 & 984 & 1011 & 694 & 1749 & 994 \\
1380 & 862 & 468 & 361 & 492 & 700 & 1834 & 4680 & 489 & 543 & 696 & 2945 & 652 \\
1161 & 561 & 404 & 158 & 329 & 554 & 1516 & 4499 & 166 & 661 & 497 & 2158 & 230 \\
1735 & 1126 & 347 & 778 & 337 & 116 & 1971 & 5042 & 791 & 1260 & 1120 & 2814 & 707 \\
0 & 611 & 1565 & 1084 & 1485 & 1686 & 589 & 3338 & 998 & 971 & 692 & 1821 & 1028 \\
0 & 0 & 963 & 517 & 878 & 1075 & 974 & 3942 & 408 & 666 & 222 & 2102 & 418 \\
0 & 0 & 0 & 508 & 103 & 232 & 1898 & 4903 & 568 & 946 & 894 & 2871 & 578 \\
0 & 0 & 0 & 0 & 455 & 690 & 1491 & 4418 & 128 & 502 & 395 & 2584 & 316 \\
0 & 0 & 0 & 0 & 0 & 236 & 1802 & 4820 & 496 & 924 & 827 & 2767 & 482 \\
0 & 0 & 0 & 0 & 0 & 0 & 1955 & 5009 & 717 & 1159 & 1049 & 2845 & 661 \\
0 & 0 & 0 & 0 & 0 & 0 & 0 & 3093 & 1377 & 1515 & 1147 & 1232 & 1319 \\
0 & 0 & 0 & 0 & 0 & 0 & 0 & 0 & 4337 & 4175 & 4023 & 2814 & 4349 \\
0 & 0 & 0 & 0 & 0 & 0 & 0 & 0 & 0 & 559 & 332 & 2458 & 208 \\
0 & 0 & 0 & 0 & 0 & 0 & 0 & 0 & 0 & 0 & 443 & 2718 & 761 \\
0 & 0 & 0 & 0 & 0 & 0 & 0 & 0 & 0 & 0 & 0 & 2309 & 450 \\
0 & 0 & 0 & 0 & 0 & 0 & 0 & 0 & 0 & 0 & 0 & 0 & 2330 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0
\end{bmatrix}$$

CONTINUE (FROM FIG. 11A) / (TO FIG. 11C)

FIG. 11B

CONTINUE (FROM FIG. 11B)

| | | | | | | | | | | | | |
|---|---|---|---|---|---|---|---|---|---|---|---|---|
|1182|1134|787|986|127|826|1361|2383|2153|1328|133|546|401|
|1075|920|726|716|417|598|1180|2372|2004|1280|330|256|110|
|832|456|697|147|962|217|757|2196|1587|1124|898|351|470|
|1383|1363|979|1213|136|1056|1583|2521|2362|1500|189|755|611|
|729|441|996|690|1678|750|357|1767|865|983|1662|1156|1266|
|716|297|874|312|1389|464|504|2034|1239|1081|1344|807|923|
|463|948|616|1257|1370|1029|801|1038|1093|170|1481|1375|1348|
|1015|1415|1343|1790|2145|1630|1139|401|735|789|2246|2051|2056|
|1322|1257|928|1081|153|942|1493|2519|2291|1468|39|612|471|
|1224|1543|1596|1921|2426|1803|1244|566|580|1061|2511|2249|2274|
|816|641|516|491|622|322|899|2149|1725|1050|589|248|236|
|425|814|803|1186|1642|1028|555|981|659|320|1717|1459|1477|
|979|645|771|328|840|362|944|2344|1777|1254|749|176|316|
|719|624|290|557|612|334|850|2031|1659|933|617|380|344|
|1295|1254|896|1098|88|944|1481|2470|2269|1429|95|642|498|
|444|781|840|1157|1683|1018|503|1026|582|399|1749|1460|1488|
|169|480|238|751|1076|521|473|1487|1152|392|1138|900|901|
|1122|973|767|765|384|651|1233|2411|2056|1322|282|294|151|
|654|476|411|410|764|175|724|2001|1550|907|752|383|407|
|1041|930|674|761|349|613|1176|2314|1989|1229|298|333|191|
|1243|1166|853|990|174|850|1404|2461|2207|1400|63|527|383|
|860|1314|1131|1672|1899|1481|1072|515|904|584|2012|1873|1861|
|3780|4036|4155|4397|4977|4330|3735|2637|2907|3612|5069|4786|4825|
|559|434|282|510|263|250|689|1892|1493|792|781|496|193|
|687|203|743|224|1257|326|474|1993|1268|996|1219|699|805|
|284|266|344|538|1086|336|365|1651|1162|583|1113|768|802|
|2034|2514|2177|2848|2728|2622|2298|912|2002|1727|2883|2938|2884|
|587|662|193|717|659|458|814|1833|1566|747|722|610|557|
|0|486|406|817|1246|621|372|1365|982|308|1706|1037|1052|
|0|0|599|378|1237|323|302|1796|1132|794|1228|771|850|
|0|0|0|757|842|495|683|1646|1390|554|915|764|733|
|0|0|0|0|1107|264|677|2165|1490|1121|1046|495|617|
|0|0|0|0|0|936|1450|2396|2221|1366|177|674|528|
|0|0|0|0|0|0|602|1987|1438|908|911|458|527|
|0|0|0|0|0|0|0|1530|836|633|1468|1059|1123|
|0|0|0|0|0|0|0|0|1094|1099|2516|2387|2376|
|0|0|0|0|0|0|0|0|0|978|2271|1896|1955|
|0|0|0|0|0|0|0|0|0|0|1459|1288|1278|
|0|0|0|0|0|0|0|0|0|0|0|574|433|
|0|0|0|0|0|0|0|0|0|0|0|0|145|
|0|0|0|0|0|0|0|0|0|0|0|0|0|
|0|0|0|0|0|0|0|0|0|0|0|0|0|
|0|0|0|0|0|0|0|0|0|0|0|0|0|
|0|0|0|0|0|0|0|0|0|0|0|0|0|
|0|0|0|0|0|0|0|0|0|0|0|0|0|
|0|0|0|0|0|0|0|0|0|0|0|0|0|

CONTINUE (FROM FIG. 11C) {
| | | | | | | | | |
|---|---|---|---|---|---|---|---|---|
| 2484 | 2421 | 1933 | 1776 | 844 | 975 | 1025 | 1166 | 173 | 308 |
| 2399 | 2392 | 1870 | 1627 | 704 | 949 | 738 | 1028 | 129 | 27 |
| 2083 | 2180 | 1582 | 1229 | 510 | 906 | 229 | 724 | 696 | 544 |
| 2664 | 2570 | 2135 | 1986 | 1061 | 1146 | 1241 | 1378 | 375 | 525 |
| 1461 | 1700 | 1071 | 601 | 801 | 1046 | 802 | 615 | 1465 | 1319 |
| 1805 | 1988 | 1358 | 926 | 649 | 1008 | 408 | 642 | 1142 | 991 |
| 1192 | 1072 | 694 | 815 | 739 | 388 | 1434 | 597 | 1376 | 1317 |
| 446 | 349 | 296 | 773 | 1388 | 1139 | 1964 | 1107 | 2123 | 2042 |
| 2625 | 2559 | 2094 | 1913 | 980 | 1115 | 1101 | 1304 | 237 | 389 |
| 102 | 433 | 429 | 794 | 1599 | 1415 | 2085 | 1287 | 2370 | 2273 |
| 2138 | 2158 | 1611 | 1348 | 439 | 748 | 569 | 756 | 393 | 254 |
| 900 | 953 | 370 | 381 | 802 | 646 | 1362 | 504 | 1571 | 1474 |
| 2260 | 2336 | 1750 | 1416 | 624 | 997 | 313 | 885 | 553 | 405 |
| 2043 | 2045 | 1514 | 1281 | 350 | 620 | 663 | 676 | 440 | 331 |
| 2590 | 2513 | 2059 | 1892 | 962 | 1075 | 1127 | 1283 | 261 | 410 |
| 886 | 985 | 371 | 285 | 814 | 703 | 1330 | 499 | 1595 | 1491 |
| 1484 | 1491 | 953 | 781 | 239 | 237 | 927 | 208 | 987 | 892 |
| 2447 | 2433 | 1916 | 1678 | 753 | 987 | 781 | 1078 | 86 | 80 |
| 1971 | 2006 | 1447 | 1173 | 279 | 631 | 536 | 585 | 562 | 428 |
| 2363 | 2339 | 1831 | 1610 | 679 | 890 | 801 | 1005 | 110 | 96 |
| 2552 | 2497 | 2021 | 1829 | 895 | 1049 | 1014 | 1220 | 147 | 299 |
| 735 | 542 | 403 | 815 | 1213 | 911 | 1851 | 975 | 1903 | 1836 |
| 2458 | 2560 | 2989 | 3263 | 4152 | 3966 | 4538 | 3833 | 4930 | 4830 |
| 1883 | 1899 | 1355 | 1114 | 181 | 508 | 652 | 510 | 606 | 493 |
| 1805 | 1957 | 1334 | 931 | 518 | 889 | 370 | 556 | 1018 | 867 |
| 1578 | 1640 | 1059 | 784 | 160 | 448 | 716 | 192 | 937 | 817 |
| 1482 | 1041 | 1561 | 2028 | 2330 | 1949 | 3026 | 2153 | 2846 | 2831 |
| 1291 | 1856 | 1360 | 1191 | 292 | 409 | 852 | 586 | 586 | 519 |
| 1324 | 1357 | 796 | 614 | 376 | 339 | 996 | 134 | 1151 | 1050 |
| 1635 | 1764 | 1148 | 774 | 382 | 713 | 549 | 353 | 1034 | 893 |
| 1698 | 1665 | 1167 | 1019 | 225 | 231 | 916 | 431 | 780 | 705 |
| 2012 | 2139 | 1526 | 1144 | 547 | 946 | 178 | 697 | 844 | 691 |
| 2529 | 2441 | 2000 | 1830 | 917 | 1011 | 1150 | 1242 | 298 | 434 |
| 1900 | 1975 | 1388 | 1068 | 295 | 694 | 422 | 523 | 715 | 571 |
| 1335 | 1486 | 860 | 472 | 526 | 698 | 841 | 267 | 1285 | 1153 |
| 591 | 145 | 697 | 1173 | 1726 | 1424 | 2342 | 1472 | 2414 | 2351 |
| 622 | 983 | 501 | 378 | 1312 | 1280 | 1634 | 987 | 2099 | 1977 |
| 1163 | 1112 | 640 | 670 | 631 | 354 | 1300 | 440 | 1344 | 1257 |
| 2613 | 2554 | 2082 | 1892 | 959 | 1107 | 1063 | 1284 | 201 | 354 |
| 2347 | 2390 | 1827 | 1526 | 663 | 995 | 489 | 961 | 380 | 240 |
| 2374 | 2389 | 1848 | 1580 | 671 | 961 | 630 | 992 | 236 | 96 |
| 0 | 449 | 531 | 878 | 1699 | 1518 | 2175 | 1386 | 2472 | 2374 |
| 0 | 0 | 632 | 1100 | 1727 | 1451 | 2313 | 1454 | 2442 | 2369 |
| 0 | 0 | 0 | 476 | 1172 | 991 | 1697 | 867 | 1940 | 1845 |
| 0 | 0 | 0 | 0 | 933 | 929 | 1301 | 609 | 1721 | 1600 |
| 0 | 0 | 0 | 0 | 0 | 400 | 714 | 326 | 789 | 678 |
| 0 | 0 | 0 | 0 | 0 | 0 | 1115 | 432 | 991 | 928 |
| 0 | 0 | 0 | 0 | 0 | 0 | 0 | 876 | 866 | 718 |
| 0 | 0 | 0 | 0 | 0 | 0 | 0 | 0 | 1116 | 1002 |
| 0 | 0 | 0 | 0 | 0 | 0 | 0 | 0 | 0 | 152 |

FIG. 11D

ALBANY
ANNAPOLIS
ATLANTA
AUGUSTA
AUSTIN
BATON ROUGE
BISMARK
BOISE
BOSTON

CARSON CITY
CHARLESTON
CHEYENNE
COLUMBIA
COLUMBUS
CONCORD
DENVER
DES MOINES
DOVER

FRANKFORT
HARRISBURG
HARTFORD
HELENA
HONOLULU
INDIANAPOLIS
JACKSON
JEFFERSON CITY
JUNEAU

LANSING
LINCOLN
LITTLE ROCK
MADISON
MONTGOMERY
MONTPELIER
NASHVILLE
OKLAHOMA CITY
OLYMPIA

PHOENIX
PIERRE
PROVIDENCE
RALEIGH
RICHMOND
SACRAMENTO
SALEM
SALT LAKE CITY
SANTA FE

SPRINGFIELD
ST. PAUL
TALLAHASSEE
TOPEKA
TRENTON
WASHINGTON

COMPUTER SYSTEM CONFIGURED IN SUPPORT OF SOLVING NP-COMPLETE PROBLEMS AT HIGH SPEED

This application is a continuation-in-part of application Ser. No. 09/006,367 filed Jan. 13, 1998 now abandoned, entitled COMPUTER SYSTEM CONFIGURED TO PRECISELY SOLVE-NP COMPLETE PROBLEMS AT HIGH SPEED, which is incorporated herein by reference.

BACKGROUND OF THE INVENTION

1. Field of the Invention

The invention relates generally to computer systems, and specifically to a computer system specially configured in support of solving NP-complete type problems of the polynomial difficulty.

2. Background of the Prior Art

It is known that a precise solution to an NP-complete type problem of discrete mathematics, such as the problem of finding the minimum Hamiltonian cycle in a Hamiltonian network, can be found by constructing all possible solutions of the problem and selecting the optimal solution among them. The problem with this method of constructing and comparing all possible solutions is that, since the number of possible solutions depends on the problems dimension N as N!, existing computers can construct and evaluate the set of possible solutions within a practical amount of time only in the case where N is sufficiently small. Significant time delays of up to several minutes and attendant component degradation are observed in the case where currently available computer systems are employed to solve moderate node sized minimal cycle problems (e.g. N=10–20) using the approach of constructing all possible solutions. As the number of nodes increases, computation time requirements increase exponentially. It is estimated that the fastest available computer system would require at least one month of computation time to precisely solve a simple 30 Node minimal Hamiltonian cycle problem wherein a primary network contains non-binary edge weights using a construct-all-solutions approach.

Currently available computer systems which claim to provide solutions to Hamiltonian cycle problems within a reasonable time employ methods having method steps based on approximations of exact solutions. Accordingly, these systems cannot be relied upon where an exact solution to an NP-complete type problem is required.

Other attempts have been made to model Hamiltonian networks using resistive circuits. Studies have shown that a minimum Hamiltonian cycle can be defined by Kirchoff's equations. Nevertheless, as is the case with existing computer-implemented methods, problems have been noted in the accuracy attainable with methods based on physical modeling.

There exists then a need for a computer system configured to precisely solve NP-complete type problems such as Hamiltonian cycle problems within a practical time frame.

SUMMARY OF THE INVENTION

According to its major aspects and broadly stated, the present invention is a computer system comprising a microprocessor in communication with a memory space that is configured to precisely solve NP-complete type problems, including problems which, based on the number of nodes, have large dimensions. The computer system is configured to solve the minimal Hamiltonian cycle of a primary network comprised either of edges having non-binary (which may include positive and negative weights) or of binary (0 or 1) valued weights.

The computer-implemented method includes the steps of recording in a computer memory space a primary network represented by the matrix of its edge weights; forming an equivalent representation of the primary network as a set of N subnetworks; improving a path of the network by reordering the nodes of the path according to a predetermined set of reordering rules; transforming the set of subnetworks by changing weights in the subnetworks according to a predetermined set of edge weight changing rules; and repeating the improving and transforming steps until an exit condition is satisfied.

In the forming step for separating the primary network into N subnetworks, each subnetwork is formed by changing the weights of certain edges of the primary network so that, in each formed subnetwork, all edges incident to one node of the subnetwork have zero weight.

In the improvement step, a starting path, or ordering of nodes is selected, and improved by reordering the nodes of the network according to a predetermined set of reordering rules. The ordering of nodes after the first or any subsequent reordering is referred to as the present minimal path. In one variation of the improvement step, data from the first subnetwork is used while the path is subjected to a test wherein the weight of a connecting edge connecting a certain node of the path is compared to the edge weights of remaining non-incident edges of the present path. If the weight of the connecting edge is less than that of any remaining in the path, than the path is reordered so that the node connected by the connecting edge is interposed between the pair of nodes connected by the path edge having greater weight than the connecting edge. After the path is reordered considering the edge weights of the first subnetwork, the test is applied using the reordered cycle and the weights of the cycle of the second subnetwork. The improvement procedure continues until a termination condition is satisfied.

When the improvement procedure is complete, the edge weights of certain edges of each subnetwork are changed according to a set of edge weight changing rules in a transformation step according to the invention. In one variation of the transformation step, each subnetwork is subjected to a test wherein the weight of a connecting edge of an initial node of an improved path (as determined in the preceding improvement step) is compared to the edge weights of non-incident edges of the path. If the connecting edge has a weight greater or equal to the maximum edge weight of the remaining non-incident edges in the path, then edge weights of certain edges in the set of subnetworks are changed by an amount determined by the difference between the edge weights of certain connecting edges of the path. The edge weight changing procedure is carried out for each subnetwork of the set of subnetworks until a termination condition is satisfied.

The improvement step and the transformation step are repeated until an exit condition is satisfied. An exit condition is satisfied either if the present minimal path is not reordered on application of the set of reordering rules, or the edge weight of the edges of the set of subnetworks are not changed on application of the edge weight changing rules. When an exit condition is satisfied, the ordering of the present minimal path during the most recent application of the improvement step is stored in the computer system's memory space as the minimal passage along the Hamiltonian cycle, and the sum of edge weights associated with the path is stored in the memory space as the value of the minimal Hamiltonian cycle.

A major advantage of the invention is that the computer implemented method dramatically reduces the computational time necessary to solve minimal Hamiltonian cycle problems, as compared to the only known alternative precise solution method involving constructing and comparing all possible solutions. As a result, the method frees up computer systems configured to solve minimal Hamiltonian cycle problems to perform other tasks, or to solve additional minimal Hamiltonian cycle problems within a given time frame. The dramatic reduction in the number of data transfers required to solve minimal cycle problems also significantly reduces computer component degradation resulting from the required data transfers.

These and other features and advantages of the present invention will become apparent to skilled artisans from the detailed description of the preferred embodiment hereinbelow.

BRIEF DESCRIPTION OF THE DRAWINGS

FIG. 8A is a tabular representation of a present set of subnetworks formed on completion of the first stage of the transformation step;

FIG. 8B shows a graphical representation of data corresponding to the present minimal path and the initial set of subnetworks considered the first stage of the transformation step;

FIG. 8C shows a present primary network formed during the first stage of the transformation step;

FIG. 9 is a tabular representation of a present set of subnetworks developed during application of the transformation step according to the invention;

FIG. 10 is a tabular representation of a primary network corresponding to a 30 node machine tool movement problem;

FIG. 11 is a tabular representation of a primary network corresponding to a 51 node Traveling Salesman Problem; and FIG. 12 is a tabular representation of a primary network corresponding to a 50 node Hamiltonian cycle in graph problem.

DETAILED DESCRIPTION OF THE INVENTION

Figure 1:
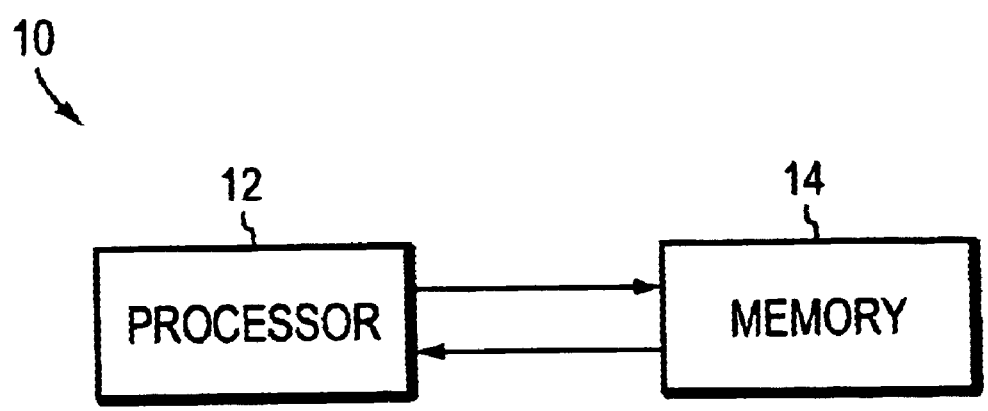
FIG. 1 is a block diagram of a computer system in which the present invention may be implemented.

Shown in FIG. 1 is a block diagram of a computer system in which the present invention may be implemented. Computer system 10 includes a processor 12 in communication with a memory space 14 which typically includes memory elements of two main types including a read-only memory device for storing a program for operating processor 12 and a read-write memory device primarily for storing data operated on by processor 12.

As is well known to skilled artisans, a program comprising instructions recognizable by processor 12 enabling computer system 10 to operate in accordance with a certain protocol may be stored on a transportable memory device such as a floppy disk or compact disk. Processor 12 may read the program instructions directly from the transportable memory device in which case the transportable device forms part of memory space 14 of system 10, or else processor 12 can read an entire set of program instructions from the transportable storage device, write the entire set of instructions into a non-transportable memory device storage location of memory space 14, and execute the instructions by reading them from the non-transportable memory device storage location without further reading of the instructions from the transportable memory device.

The present invention is a computer system configured to solve NP-complete problems of the polynomial difficulty within a time frame polynomially dependant on the problem's dimension. Described herein are particular solutions for the NP-complete problems of determining the minimal Hamiltonian cycle in a non-binary network comprised of edges which may have positive and negative weights, and the problem of determining the Hamiltonian cycle in graph. The Hamiltonian cycle in graph problem refers to the particular case where a network comprises binary edge weights equal to 1 or 0. Numerous engineering problems can be modeled as minimal Hamiltonian cycle problems.

Commonly encountered engineering problems which can be modeled as minimal Hamiltonian cycle problems include problems such as the Traveling Salesman Problem which serves as the model for such particular problems as the delivery of post and goods, and routing for public transportation and emergency vehicles; the problem of object movement along a path, including the problem of machine tool movement; various communications network problems; data delivery via computer network problems; and various production planning problems.

Cook's theorem states that if one NP-complete type problem of the polynomial difficulty is solved, then solutions exist to all problems belonging to this class. (Cook, S. A. "The Complexity of Theorem-proving Procedures," Proc. 3rd Ann. ACM Symp. *On Theory of Computing Machinery*, New York, 151–158 (1.5; 2.6; 3.11; 5.2; A1.4; A9.1) (1971)). Accordingly, skilled artisans will recognize that the inventions described herein can be adapted to solve NP type problems of the polynomial difficulty which can be modelled as Traveling Salesman and Hamiltonian cycles in graph problems.

Problems of the type which the present invention may be adapted to solve are discussed in (Computers and Intractability, by Michael R. Garey and David S. Johnson, Bell Laboratories, Murray Hill, N.J., W.H. Freeman & Co., San Francisco, 1979.

Figure 2:
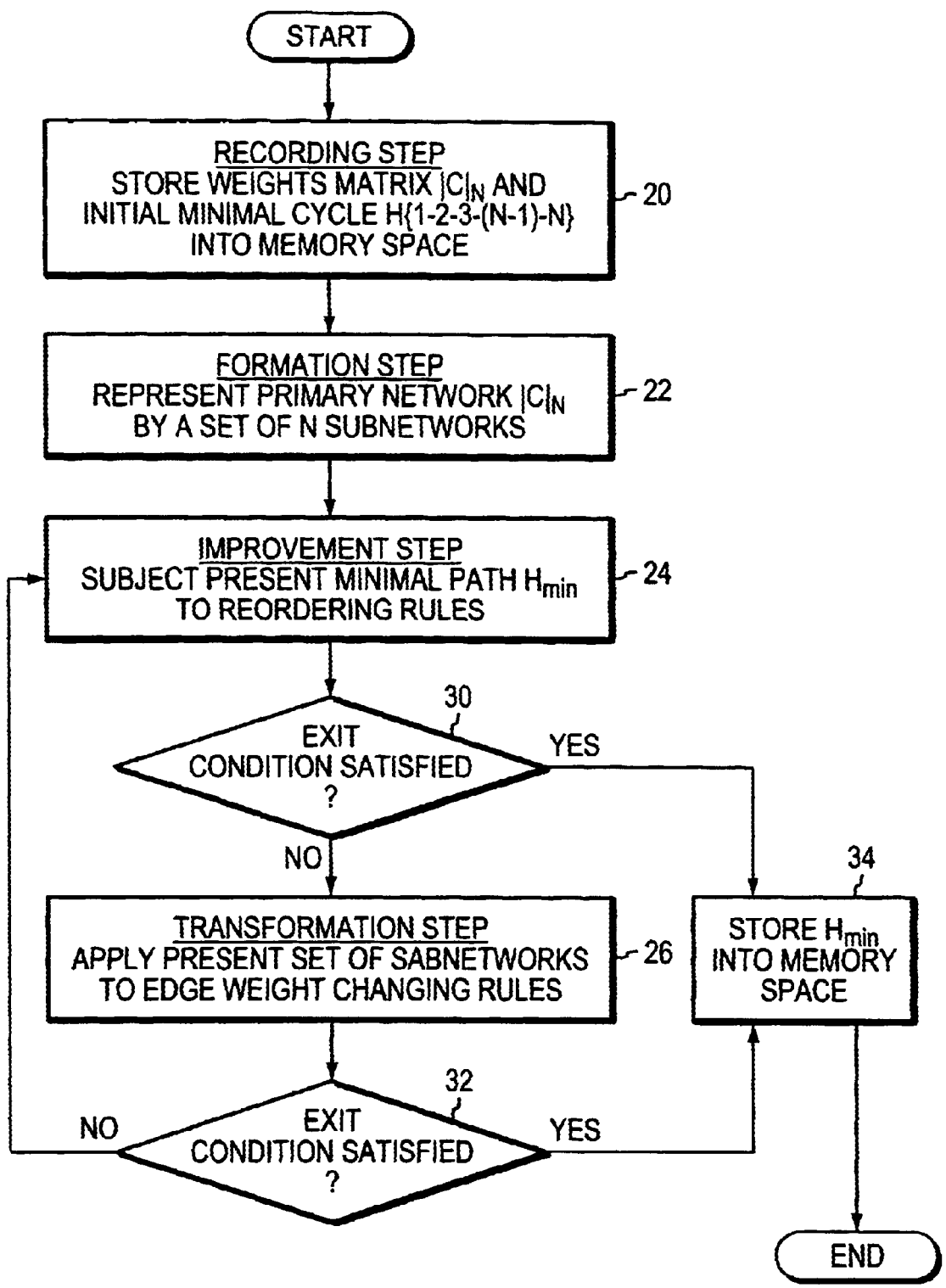
FIG. 2 is a flow diagram illustrating a minimal Hamiltonian path finding method according to the invention.

A flow diagram illustrating the major steps of one embodiment of the invention is shown in FIG. 2. A method according to the invention includes the steps of, at step 20, recording in a computer memory space a primary network represented by the matrix of its edges; at step 22 forming an equivalent representation of the primary network as a set of N subnetworks; at step 24 improving a cycle of the network by reordering the nodes of the cycle according to a set of reordering rules; at step 26 transforming the set of subnetworks by reducing weights in the subnetworks according to a set of changing rules; and repeating the improving and transforming steps until an exit condition is satisfied.

The formation of a set of equivalent subnetworks from a primary network is a major feature of the invention. This method step developed by the inventors reveals properties of the primary network which cannot be determined without equivalent network formation, and provides a framework for isolating a minimal Hamiltonian path in the primary network.

The individual steps of the method described above are described with reference to FIGS. 3 through 9 showing graphical and tabular representations of various networks and subnetworks constructed and operated on at various stages in the method's operation.

Figure 3:
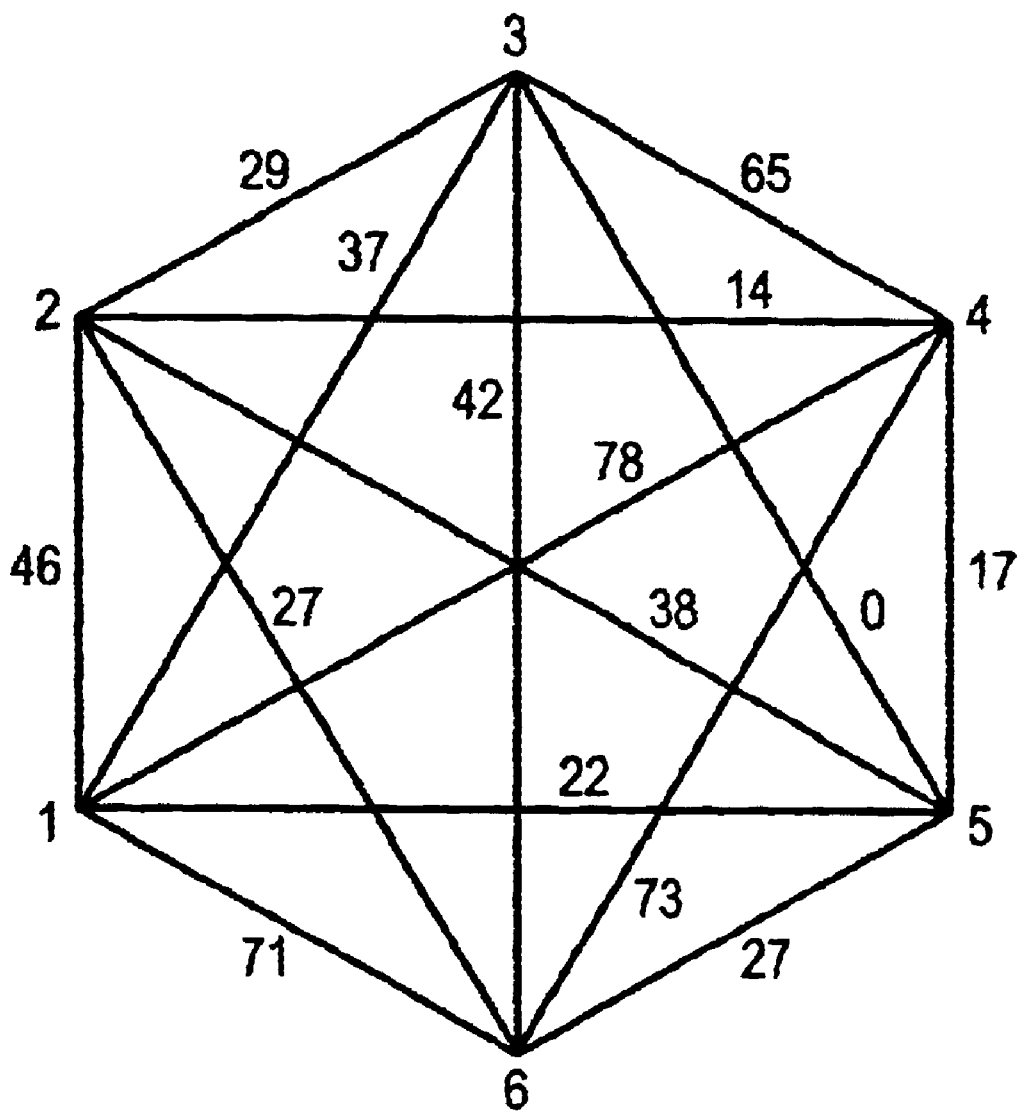
FIG. 3 is a graphical representation of a primary network which is recorded into a memory space in a recording step according to the invention.

A graphical representation of a primary network, which is recorded into memory 14 in a first step of a method according to the invention is shown in FIG. 3. If the NP-complete problem being solved is a Traveling Salesman type problem then Nodes 1–6 of the network shown correspond to various cities while edges e.g. Edge $C_{16}=71$ correspond to distances between the various cities. If the problem involves control of an object in space then Nodes 1–6 may correspond to positions required to be realized by the object while the edges of the network may represent distances or times required to move between those various positions.

An example of a six node primary network which is recorded into memory space 14 in the first step of the method is shown in FIG. 3. While the present invention can be applied to solving problems involving very large dimensions, a simple six node problem is selected to illustrate the major features of the invention. The primary network is represented by a matrix of its edges weights. The nodes of the network are numbered Nodes 1–6, while the weights of the edges are listed adjacent to the line segments shown connecting the various nodes, e.g. $C_{65}=27$. In the actual recording of the primary network into memory space 14 of computer system 10, each edge weight may be recorded into a particular memory space location that is designated according to the pair of nodes that a particular edge connects.

In the description of the invention which follows the definition of certain terms should be well understood. The term "incident" is used herein to refer to an edge that extends from a certain node. For example, the edges $C_{12}$, $C_{13}$, $C_{15}$, and $C_{16}$ are the edges in the primary network incident to Node 1. A "connecting edge" of a particular node herein refers to an edge that connects nodes incident to edges incident to the particular node. For example, the edge between nodes 2 and 6, $C_{26}$, is the connecting edge of node 1. An "initial node" of a path refers to the node corresponding to the number of the subnetwork whose data is being applied in a method step described herein. That is, if data from a first subnetwork is being applied, the initial node is node 1. If data from a second subnetwork is applied, the initial node is node 2, and so on. A Hamiltonian cycle of the primary network refers to the sum of a sequence of edge weights along a path which contains all nodes of the network. A Hamiltonian cycle may also be referred to as a Hamiltonian value. A Hamiltonian "path" of a network, meanwhile, refers to an ordering of nodes in a network. Thus, in the primary network shown in FIG. 3, the path H(1-2-3-4-5-6-1) has a Hamiltonian cycle of 46+29+65+17+27+71=255.

The number of Hamiltonian cycles in a network is large and is equal to (N−1)!. Thus, it can be seen that a method for finding the minimum Hamiltonian cycle by calculating the length of each candidate cycle and sorting out among them the cycle having the shortest length would be impractical for even the fastest available computer systems of the type having the general configuration shown in FIG. 1. The method described herein involves mathematical simplifications which make it possible to find a precise minimal Hamiltonian cycle in a recorded primary network without calculating the length of each candidate cycle. The method is specifically designed for application in a computer system of the type described in FIG. 1 in that the method provides for a precise solution to the problem of finding a minimal Hamiltonian cycle when implemented in a computer system of the type described with reference to FIG. 1, but has no practical utility outside of such implementation.

Figure 4:
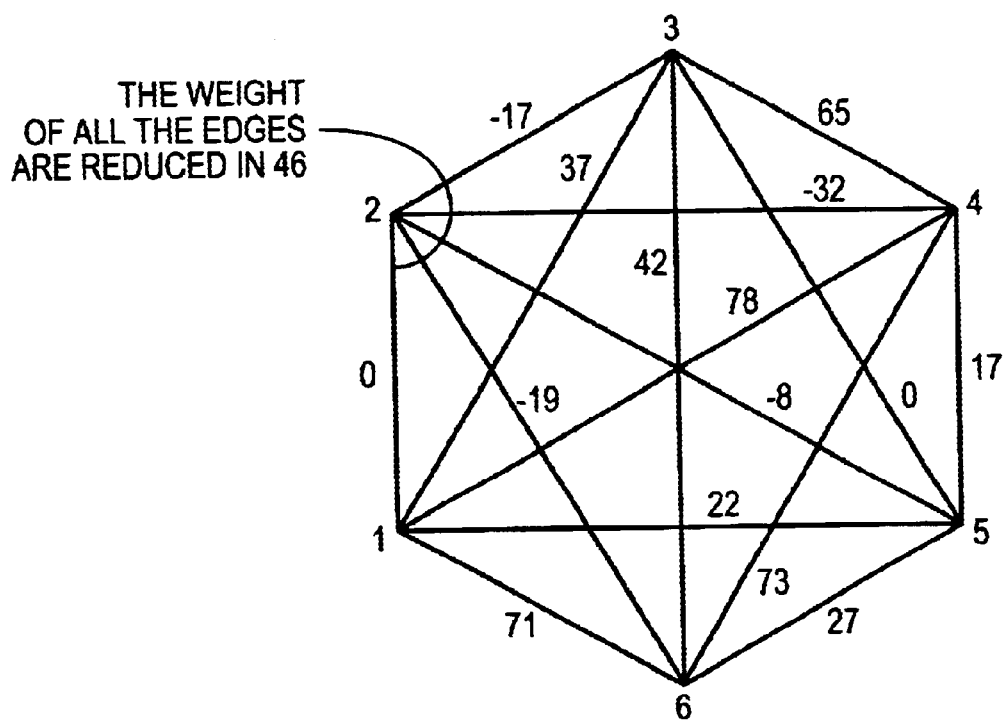
FIG. 4 is a graphical representation of a partially formed subnetwork formed in a forming step according to the invention.

The second step in the method of the invention, involving forming an equivalent representation of the primary network by separation of the primary network into a set of N subnetworks, is described with reference to FIGS. 3 and 4. In the forming step, the primary network is separated into a set of N subnetworks, by subjecting a primary network to a predetermined set equivalent network forming rules. Specifically, each subnetwork is formed by changing each edge weight of the primary network according to a method wherein the edge weights of each edge incident to one node of the resulting subnetwork are changed so that they have zero weight. The formation of a set of equivalent subnetworks from a primary network is a major feature of the invention. This method step developed by the inventors reveals properties of the primary network which cannot be determined without equivalent network formation, and provides a framework for isolating a minimal Hamiltonian path in the primary network.

The formation of the first subnetwork is illustrated with reference to FIGS. 4 and 5. In the formation of the first subnetwork, the weights of all edges of the primary network incident to Node 2 are reduced by a unit according to the edge weight of the edge between the first and second nodes of the primary network, that is 46 units in the primary network shown. FIG. 4 shows a partially formed first subnetwork shown in its state after application of the first part of the forming step for forming a first subnetwork. When the partially formed subnetwork of FIG. 4 is formed, the edge weights of each edge incident to Node 3 of the partially formed subnetwork are reduced by a unit determined by the edge weight of the edge between Nodes 1 and 3 of the primary network, that is 57 units. After each edge weight incident to Node 3 is reduced by the edge weight between Nodes 1 and 3 of the primary network, each edge weight incident to Node 4 of the resulting partially formed first subnetwork is reduced by the weight of the edge between Nodes 1 and 4 of the primary network of FIG. 3, and so on until the first subnetwork is formed.

The second subnetwork of the set of subnetworks is formed according to the same rules governing formation of the first subnetwork except that the unit values by which the weights of the network are reduced are determined according to edge weights of the primary network that are incident to Node 2 instead of being determined by the edge weights of edges incident to Node 1 as in the formation of the first subnetwork. In the formation of the second subnetwork the edge weights incident to Node 1 is to be reduced in 46 units, to Node 3 in 29 units, to Node 4 in 14 units, to Node 5 in 38 units, and to Node 6 in 27 units. For each subsequent subnetwork, the edge weights of edges incident to the node corresponding to the subnetwork being formed may be used to control the reducing of edge weights of the subnetwork.

Figure 5:
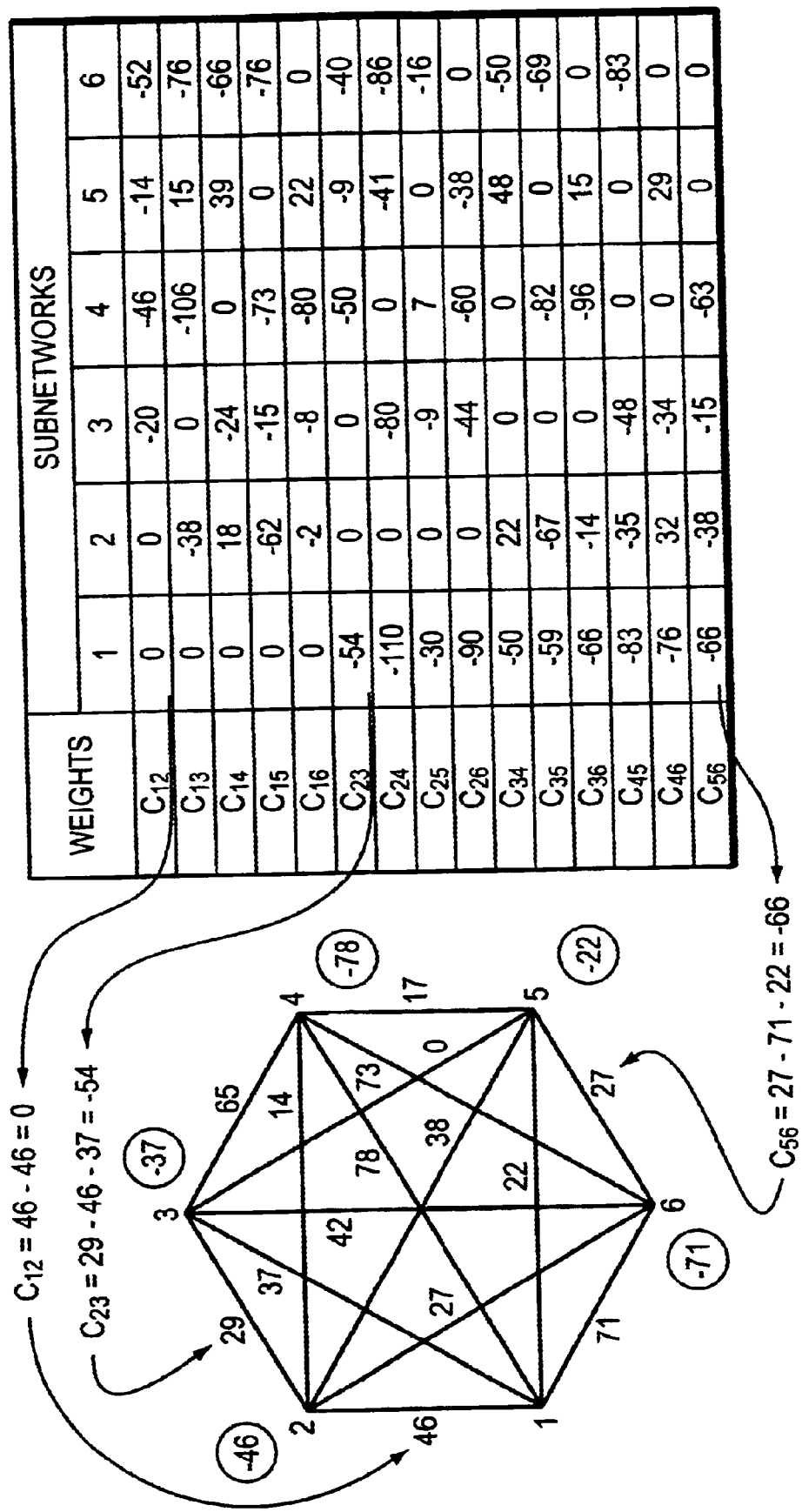
FIG. 5 is a tabular representation of a set of N subnetworks formed in a forming step according to the invention shown together with a graphical representation of a primary network.

A table representing the complete set of N subnetworks for the primary network having N=6 nodes is shown in FIG. 5 together with primary network. The determination of certain subnetwork edge weights determined according to the forming step described herein from values of the edge weights of primary network is illustrated graphically in FIG. 5. For example, the edge weight of edge $C_{56}$ in the first subnetwork is formed by taking the edge weight 27 of edge $C_{56}$ in the primary network subtracting 71, the edge weight of the edge between Nodes 1 and 6 of the primary network, and 22, the edge weight between Nodes 1 and 5 of the primary network.

An example of the improvement step of the invention is illustrated graphically with reference to FIGS. 6A–6H. In the improvement step, a starting path, or ordering of nodes is selected, and improved by reordering the nodes of the network according to a predetermined set of reordering rules. Typically, the path H[1-2-3 . . . (N–1)–N] is selected as the starting path. Each subnetwork 1–6 in the set of subnetworks shown in FIG. 5 is subjected to a test wherein the weight of a connecting edge connecting a certain node of the subnetwork is compared to the edge weights of the present path (which is the starting path when the first subnetwork is first subjected to the test). If the weight of the connecting edge is less than that of any non-incident edge in the present path, then the path is reordered so that the node connected by the connecting edge is interposed between the nodes connected by the path edge having a greater weight than the connecting edge.

Figure 6A:
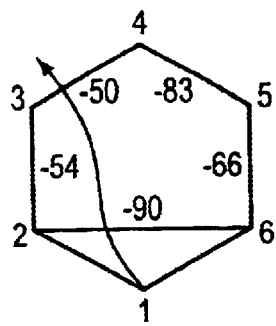
FIGS. 6A–6H show graphical representations of a series of minimal present paths developed during application of an improvement step according to the invention.

FIG. 6A shows a graphical representation of the starting path H(1-2-3-4-5-6-1) corresponding to the first subnetwork shown in FIG. 5. Applying the reordering rules to the first subnetwork, the weight, –90, of "connecting" edge $C_{26}$ connecting Node 1 as shown is compared to the edge weights of the remaining edges in the path (e. g. –54, –50, –85, –56) not incident to the node connected by the connecting edge. If the weight of the connecting edge is less than the weight of any of the edges remaining in the path not incident to the node connected by the connecting edge, then, the length of the path can be reduced by placing Node 1 between the nodes connected by the edge having a greater weight than the connecting edge. If several remaining edges have greater weight than the connecting edge then the node connected by the connecting edge should be placed between the nodes connected by the edge having the greatest weight. Thus, in the example shown in FIG. 6A, the starting path is reordered by placing Node 1 between Nodes 3 and 4 as shown.

Figure 6B:
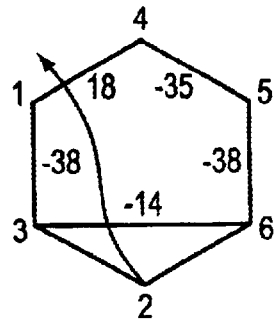
Figure 6C:
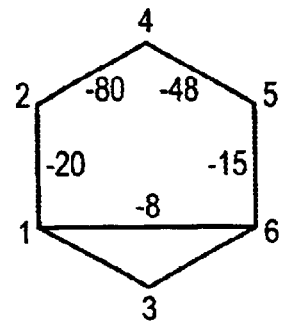
Figure 6D:
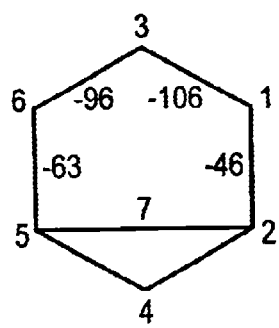
Figure 6E:
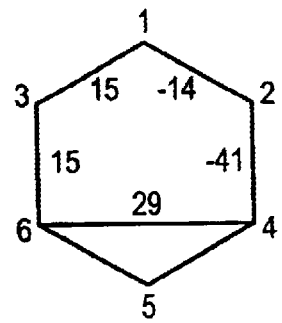
Figure 6F:
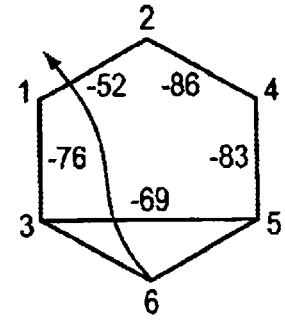
Figure 6G:
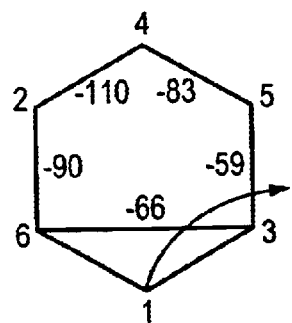
Figure 6H:
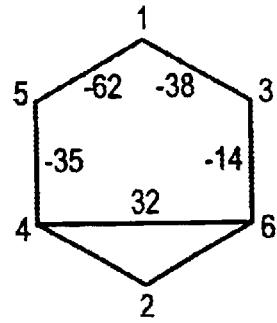

Referring to FIG. 6B, the edge weight of the edge connecting Node 2 using data from the second subnetwork shown in FIG. 5 is then compared to the remaining edge weights of edges in the path, and Node 2 is placed between nodes whose connecting edge is greatest among those greater than the connecting edge, and so on. The data used to determine whether a path should be reordered is taken from the subnetwork corresponding to the connecting node. That is, when the path is applied to the reordering test using data from the first subnetwork, the connecting edge is the edge connecting Node 1. When the path is applied to the reordering test using data from the second subnetwork, the connecting edge is the edge that connects Node 2, and so on. It is seen with reference to FIGS. 6C, 6D and 6E illustrating the testing of the condition of whether the connecting edge weight is less than any of the remaining edge corresponding to data from the third, fourth, and fifth subnetworks respectively that if the connecting edge has a weight that is greater than any remaining edge of the path, then there is no reordering of nodes of the path. The described reordering rules for reordering the present path are applied using data from each subnetwork successively, considering the connecting edge to be the edge connecting the node corresponding to the present subnetwork, until the path is not reordered on N successive applications of the test using data from each subnetwork of the set of subnetworks.

Figure 7A:
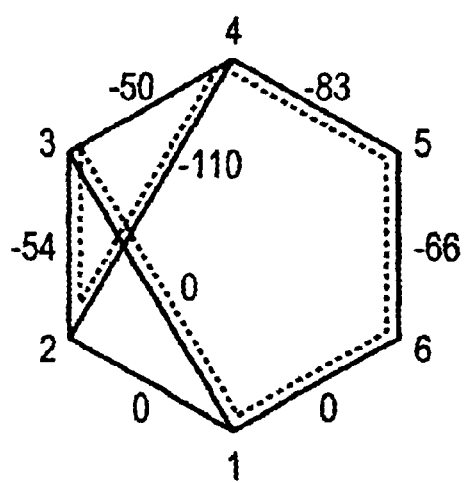
FIGS. 7A–7B show graphical representations of a progression of minimal present paths developed during application of an improvement step according to the invention.
Figure 7B:
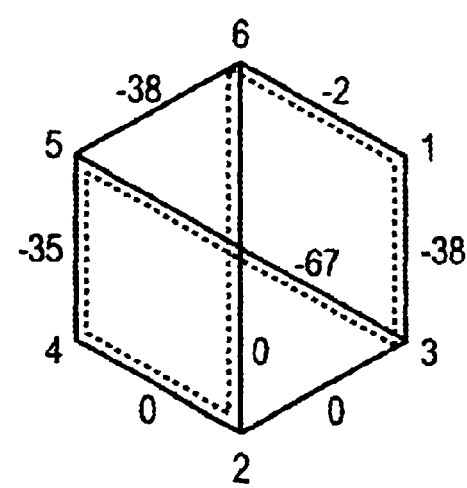

An alternative improvement step for improving the present path is shown with reference to FIGS. 7A and 7B. FIG. 7A is a graphical representation of the starting path H[1-2-3-4-5-6] using data from the first subnetwork of the set of subnetworks shown in FIG. 8. In the alternative test for reordering a present path, it is considered whether the sum of the weights of two internal cross edges connecting nodes of the path, one of which is incident to the node of the current subnetwork, is less than the sum of the weights of the edges separating the cross nodes. If the sum of the cross edges is less than the sum of the edges separated by the cross nodes, then the path is reordered so that the cross edges are considered part of the newly formed current path. In the example using the first subnetwork data shown in FIG. 7A, edge $C_{13}$ incident to the node of the current subnetwork and edge $C_{24}$ crossing edge $C_{13}$ are appropriate cross edges. The edges "separated by the cross nodes" are the edges $C_{12}$ and $C_{34}$. Because the summary weight of the cross edges (–110) is less than the summary weight of the edges (–50) separated by the cross nodes, then the path segment 1-3-2-4 is substituted for the path segment 1-2-3-4 in the formation of a new minimum current path.

When the path is reordered (or cannot be reordered) using data from the first subnetwork, the test is applied using data from the second subnetwork, as shown in FIG. 7B. Applying an alternative path improvement step using data from the second subnetwork, edge $C_{26}$ incident to the node of the present subnetwork, and edge $C_{53}$ are the cross edges while edges $C_{56}$ and edges $C_{23}$ are the edges separated by the cross nodes. Because the sum of the edge weights of the edges $C_{26}$ and $C_{53}$ is less than the sum of $C_{56}$ and $C_{23}$ then the path segment 3-5-4-2-6 is substituted for the path segment 3-2-4-5-6 in the formation of a next minimum path. Candidate pairs of cross edges can be considered in succession during application of the test. For example, referring to FIG. 7A, whether or not application of the path reordering test using cross edges $C_{13}$ and $C_{24}$ resulted in a reordering of the path, then the candidate pair of cross edges $C_{14}$ and $C_{25}$ could be applied to the test before the test is applied using data from the second subnetwork.

The improvement step is complete when application of test using data from the complete rotation of data from each of the N subnetworks does not result in any reordering of the present minimal path.

Skilled artisan will appreciate that the improvement step described herein can be carried out by applying the present path to a reordering test using combinations of the first and the alternative (the cross-edge) set of reordering rules described herein. For example, in a first iteration, data from the first subnetwork can be used to reorder the present minimal path by subjecting the path to the reordering test considering the weight of connecting edges while in a second iteration data from the second subnetwork can be used in a reordering test wherein the summary weights of a pair of cross edges is considered.

A transformation step according to the invention for reducing edge weights of a present primary network is described with reference to FIG. 5 showing a complete initial set of subnetworks formed in a formation step according to the invention, FIG. 8A showing a present set of subnetworks formed on completion of the first stage of the transformation step, FIG. 8B showing a graphical representation of data pertaining to the present minimal path, and the initial set of subnetworks considered in the first stage of the transformation step, and FIG. 8C showing a present primary network formed during the first stage of the transformation step, and FIG. 9 showing a present set of subnetworks on completion of a last stage of a transformation step.

The present set of subnetworks shown in FIG. 9 is formed in stages. In each stage of the transformation step, processor 12 considers a matrix using data corresponding to the present minimal path (as determined during the last execution of the improvement step) and to one sequentially selected subnetwork in the present set of subnetworks. The processor then analyzes this data first to determine whether a precondition is satisfied, and if the precondition is satisfied, the processor determines from the matrix a reduction factor controlling the amount of weight reduction by which certain edges in the present set of subnetworks are to be changed.

In the first stage of the transformation step, processor considers a matrix corresponding to the present minimal path using data from the first subnetwork of the present set of subnetworks. Because the present set of subnetworks is the initial set of subnetworks during the first stage, the data considered in the first stage of the transformation step is the network shown in FIG. 8B, which is a network corresponding to the present minimal path and the first subnetwork from the initial set of subnetworks shown in FIG. 5.

During execution of each stage, processor 12 executes a test to determine whether the stage will result in weights of any edges of the present set of subnetworks being changed. The precondition as it is applied during the first stage is described with reference to FIG. 8B. In determining whether edge weights in the present set of subnetworks are to be changed during the stage, processor 12 compares the weight of the connecting edge of the initial node (corresponding to the number of the present subnetwork) to the weights of edges of the path, excluding those zero-weight edges incident to the initial node. If the edge weight of the connecting edge is greater than the maximal non-incident path edge, then certain edge weights of the present set of subnetworks are changed according to a set of edge weight changing rules, which are described hereinbelow. If, however, the connecting edge is less than or equal to the maximal non-incident edge weight, then the stage ends, and proceeds to a next stage of the transformation step.

In the example described the edge weight of the connecting edge $C_{53}=-59$ is greater than the maximal non-incident path edge weight $C_{36}=-66$. Because the precondition is satisfied, processor 12 proceeds to determine a weight change factor, $\Delta$, for controlling the amount by which weights of certain edges in the present set of subnetworks are to be changed. In the first stage, a method for determining a weight change factor $\Delta_s$, for a given stage of the transformation step, where s indicates the stage is described again with reference to the network of FIG. 8B. In determining a weight change factor $\Delta_1$, for the first stage, processor 12 compares the weight of the maximal edge weight of edges in the network of FIG. 8B to the weight of the second greatest edge weight, excluding from consideration the zero-weight incident edges $C_{15}$ $C_{13}$, $C_{14}$, $C_{12}$ and $C_{16}$. The weight change factor, $\Delta_1$ is the difference between the maximal non-incident edge weight and the second greatest edge weight. After determining a weight change from $\Delta_1$, processor 12 reduces the maximal edge weight of the matrix by $\Delta_1$ so that it is equal to the weight of the second greatest edge weight. In the example described with reference to FIG. 8B, the maximal non-incident edge weight is $C_{52}=-30$ while the second greatest non-incident edge weight is $C_{43}=-50$. Processor 12 therefore reduces the maximal edge weight $C_{52}$ by $\Delta_1=20$, so that the weight of edge $C_{52}$ becomes $C_{52}=-50$.

In the case that there are more than one equal maximal edge weights, then the edge weight greatest in magnitude after the more than one equal maximal edge weight is considered to be the second greatest edge weight for use in determining the value $\Delta_s$ for a given stage, and each of the more than one maximal edge weights is reduced by $\Delta_s$. If edge $C_{56}$ in the matrix shown were $C_{16}=-30$, for example, edge $C_{34}=-50$ would still be considered to be the second greatest edge weight for the purposes of determining the weight change factor $\Delta_1$, and the weight of both of the edges $C_{52}$ and $C_{62}$ would each be reduced by $\Delta_1=20$.

According to the invention, a change of the weight of any of the edges of the set of subnetworks is equivalent to changing the corresponding edge of the present primary network, which is represented by the initial primary network of FIG. 3 before execution of the first stage of the transformation step. Thus, a reduction of edge weight $C_{52}$ in the first subnetwork shown in FIG. 8B can be expressed as a reduction in the weight of the same edge $C_{52}$ in the primary network of FIG. 3. In the example shown, the reduction of the edge weight of edge $C_{52}$ by $\Delta_1$ in the matrix of FIG. 8B to $C_{52}=-50$ is equivalent to reducing the edge weight of edge $C_{52}$ in the primary network of FIG. 3 by $\Delta_1$ to $C_{52}=18$. A present primary network formed during the first stage of the transformation step having edge weight $C_{52}$ reduced to $C_{52}=18$ is shown in FIG. 8C.

When processor 12 reduces an edge weight or weights of a previous primary network to form a present primary network, then weights of certain edges in the set of equivalent subnetworks must be changed so that the weights of all edges in the present set of subnetworks correspond to the edges of the present primary network. Processor 12 changes edge weights of edges in the remaining subnetworks in the set of subnetworks of FIG. 8A by applying the formation rules for forming a set of subnetwork from a primary network, as described herein previously. Subnetworks 2–6 shown in FIG. 8A are formed from the present primary network of FIG. 8C by applying the formation rules applied to form the set of subnetworks of FIG. 5 from the primary network of FIG. 3. Specifically, in forming the remaining subnetworks of FIG. 8A from the present primary network of FIG. 8C, processor 12 reduces all edges incident to a certain node of the present primary network by a value determined by the edge weight between the corresponding certain node in the primary network and the node in the primary network corresponding to the number of the subnetwork currently being formed. For example, in forming the xth subnetwork in the set of subnetworks of FIG. 8A, each edge weight incident to node y of the corresponding primary network is reduced by the edge weight between nodes x and y in the primary network. The end result of applying the equivalent subnetwork forming rules to the present primary network of FIG. 8C is the set of equivalent subnetworks of FIG. 8A. When the equivalent network of FIG. 8B is formed, the first stage of the transformation step is complete and processor 12 proceeds to the second stage of the transformation step.

The method of forming a present set of subnetworks, as shown in FIG. 8A, from a present primary network, as shown in FIG. 8C, can be simplified by changing only those edge weight values in the set of subnetworks requiring change without formally applying the subnetwork formation rules for each edge weight value of the set of subnetworks. Skilled artisans will recognize that various relationships correlating a change in a given edge weight value in a present primary network with changes required in edge weight values in the present set of subnetworks can be derived prior to execution of the program and then applied during program operation. For example, reducing an edge weight value, Cqr in a present primary network by $\Delta_s$, for a given stage s will result in an increase in subnetwork Q edge weights incident to node r by $\Delta_s$ units, an increase in subnetwork R edge weights incident to node q by $\Delta_s$ units, and a reducing of all edge weight values Cqr by $\Delta_s$ units in subnetworks excluding the subnetworks Q and R. Edge weight values changed during Stage 1 of the transformation step in the example considered are underlined in FIG. 8A.

The second, and thereafter the sth, stage of the formation step are executed in the manner of the first stage of the transformation step, except that data used in determining whether the precondition for edge weight reduction, and if applicable, the weight change factor, $\Delta_s$ for the stage is the data from the present set of subnetworks, which will be different from the initial set of subnetworks in the case that any previous stages resulted in an edge weight reduction of edges in the present set of subnetworks. Thus, for the second stage of the transformation step, data from the subnetwork of the second column of subnetwork shown in FIG. 8A is considered. For application of the precondition test during the second stage, the precondition is tested for of whether the initial connecting edge $C_{64}$ corresponding to node N=2 is greater or equal to the weight of any non-incident edge $C_{63}$, $C_{31}$, $C_{15}$, $C_{54}$. If the precondition is affirmed, the non-incident edge weight having the second greatest value is subtracted from the non-incident edge weight having the greatest value to determine the weight change factor $\Delta_2$, which is used to determine the amount by which weights of certain edges in the set of subnetworks are to be changed, described previously in connection with the description of the first stage of the transformation step.

Processor 12 continues execution of the transformation step for an undetermined number stages utilizing data from successive present subnetworks (subnetwork 1 data is utilized in the stage subsequent to the stage in which subnetwork N data is used) until for N successive stages (a complete cycle of subnetworks) processor 12 does not reduce any edge weight of any edge in the present set of subnetworks. That is, the transformation step terminates when the present set of subnetworks does not change for N successive stages. A present set of subnetworks at the termination of the transformation step for the example given is shown in FIG. 9.

When the transformation step is complete, processor 12, as is indicated by the flow diagram of FIG. 2 normally proceeds to a next execution of the improvement step 24 for reordering nodes of the present minimal path. Then processor 12 carries out the next execution of an improvement step applying the same node reordering rules it applied during the first execution of the improvement step except that instead of utilizing data from the initial set of subnetworks shown in FIG. 5, processor 12 utilizes data from the present set of subnetworks as the present set of subnetworks exist at the time of termination of the last execution of the transformation step.

Generally, processor 12 will alternate between executing the improvement step 24 and the transformation step 26 until an exit condition is satisfied. An exit condition may be satisfied either after execution of the improvement step or the transformation step as is indicated by decision blocks 30 and 32 of the flow diagram of FIG. 2. The minimal path finding method of the invention is exited at block 30 after execution of an improvement step if, during the improvement step, no node reordering is realizing during application of the node reordering rules utilizing data from the each of the first N subnetworks. That is, processor 12 exits the minimal path finding method after execution of the improvement step if the improvement step is terminated without there being realized any node reordering during the step. Processor 12 exits the minimal path finding method after executing transformation step 26 at block 32 if execution of the transformation step does not result in any weights of any edges in the present set of subnetworks being changed during the first N stages of the transformation step. That is, processor 12 terminates the minimal path finding method after executing the transformation step 26 if no edge weight change is realized during the step.

It will be seen then, that the minimal path finding method could feasibly be exited either after a first execution of an improvement step 30, without executing a transformation step 26 or after a first execution of the transformation step 26 if the appropriate exit conditions are satisfied, although instances of this situation occurring will be rare especially for large node problems. Skilled artisans will recognize further that the particular ordering of the improvement step and the transformation step described herein is not essential to practice of the invention, although it is generally preferred, for computation time purposes, to execute the improvement step prior to executing the transformation step. That is, it should be well understood that an embodiment of the invention wherein a transformation step is carried out prior to an improvement step is the equivalent of an embodiment where the ordering of these steps is reversed.

When the minimal path finding method is exited at block 30 or at block 32 processor 12 at step 34 stores into memory space 14 the present minimal path resulting from the last execution of the improvement step 24 as the minimal Hamiltonian path and may store the sum of the edge weights of edges connecting the nodes of the minimal path into memory space 14 as the minimal Hamiltonian cycle.

The following examples illustrate the dramatic reduction in computation time, and decreased component degradation realized with the present invention as compared with the alternative method for finding a precise solution to minimal Hamiltonian cycle type problems involving construction of all possible solutions.

Example 1

To solve the problem of finding the minimum Hamiltonian cycle, the computer system is designed as shown in FIG. 1. The Intel® Pentium Pro® processor, 200 MHZ, 512 KB cache, is used.

Figure 10:
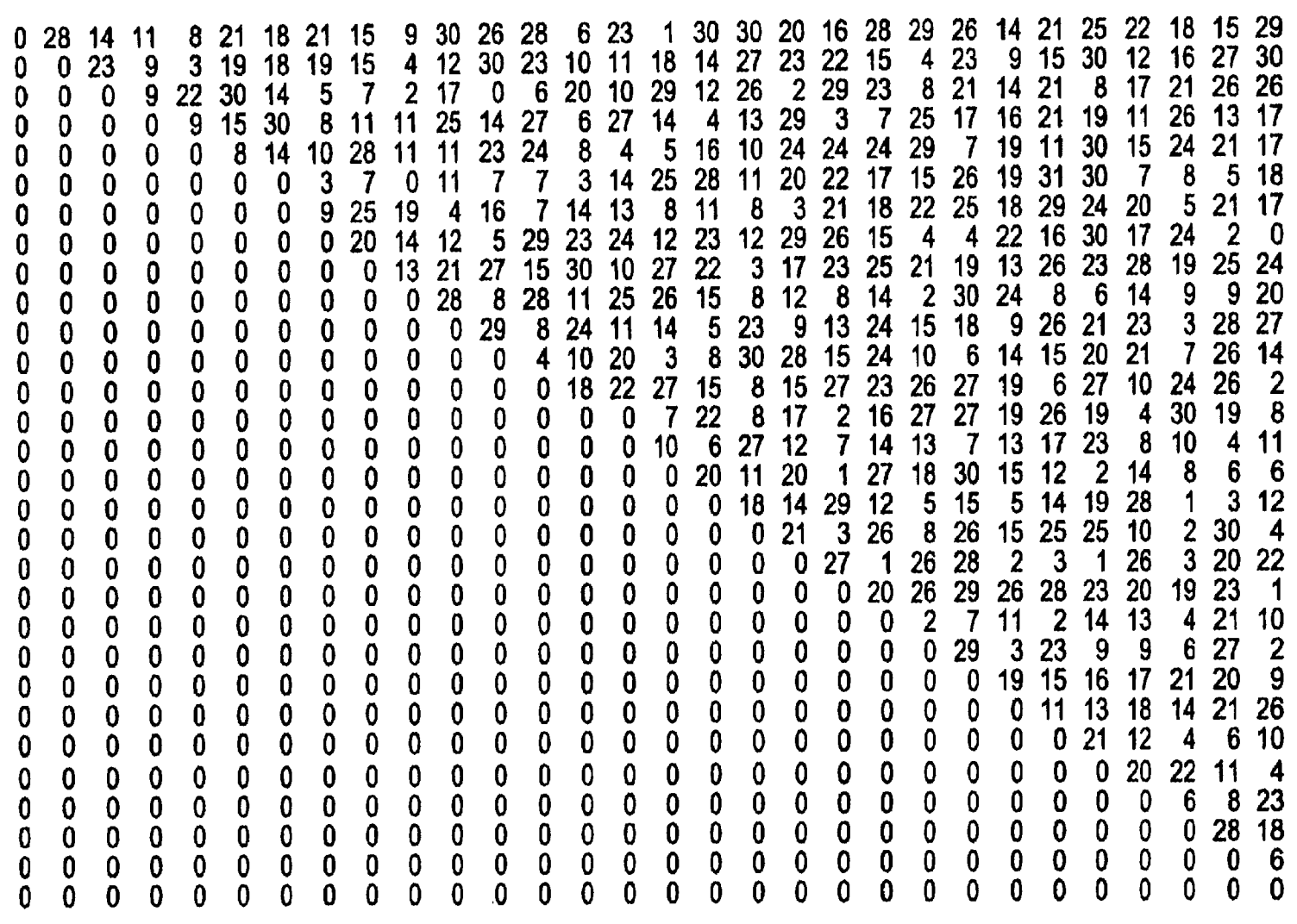

The machine tool has been exploited to machine 30 details and the times, necessary to adjust its equipment during the passage from machining one of the 30 details to machining any other detail of the given set, have been mastered. The times (in minutes) are given in the table of FIG. 10.

It is required to find the optimum regime of the machine tool exploitation (the optimum order of feeding details to be machined).

Found:

The optimum order of feeding details to be machined:
1-5-2-10-6-7-11-28-27-14-15-29-17-4-20-18-9-3-12-23-8-30-13-25-21-22-24-19-26-16-1;

The total equipment adjustment time, when machining 30 details: 90 min;

Computer running time: 4.4 sec.

Example 2

To solve the Traveling Salesman Problem, the computer is designed as shown in FIG. 1. The Intel® Pentium Pro® processor, 200 MHZ, 512 KB cache, is used.

The network consists of 50 USA capital cities and Washington, D. C. (the between-cities distances have been determined with the aid of US Atlas, v. 4.0©, developed by The Software Tool Works, Inc. and Electro Map, Inc.). The distances are given in the table of FIG. 11. It should be noted that the rule of triangle for the found between-cites distances is not fulfilled in 245 cases.

It is required for the network given to find the minimum Hamiltonian cycle (solve the Traveling Salesman Problem).

The salesman's optimum route is:

Albany-Harrisburg-Charleston-Columbus-Frankfort-Indianapolis-Lansing-Madison -Springfield-Jefferson City-Topeka-Lincoln-Des Moines-St. Paul-Bismarck-Pierre -Cheyenne-Denver-Salt Lake City-Helena-Boise-Salem-Olympia-Juneau-Honolulu -Sacramento-Carson City-Phoenix-Sante Fe-Oklahoma-Austin-Baton Rouge-Jackson -Little Rock-Nashville-Atlanta-Montgomery-Tallahassee-Columbia-Raleigh-Richmond -Washington, D.C.-Annapolis-Dover-Trenton-Hartford-Providence-Boston-Concord -Augusta-Montpelier-Albany.

The length of the optimum route: 16,244 miles.
The computer running time: 47.4 sec.

Example 3

To solve the problem of the existence of a Hamiltonian cycle in graph, the computer is designed as shown in FIG. 1. The Intel® Pentium Pros processor, 200 MHZ, 512 KB cache, is used.

Figure 12A:
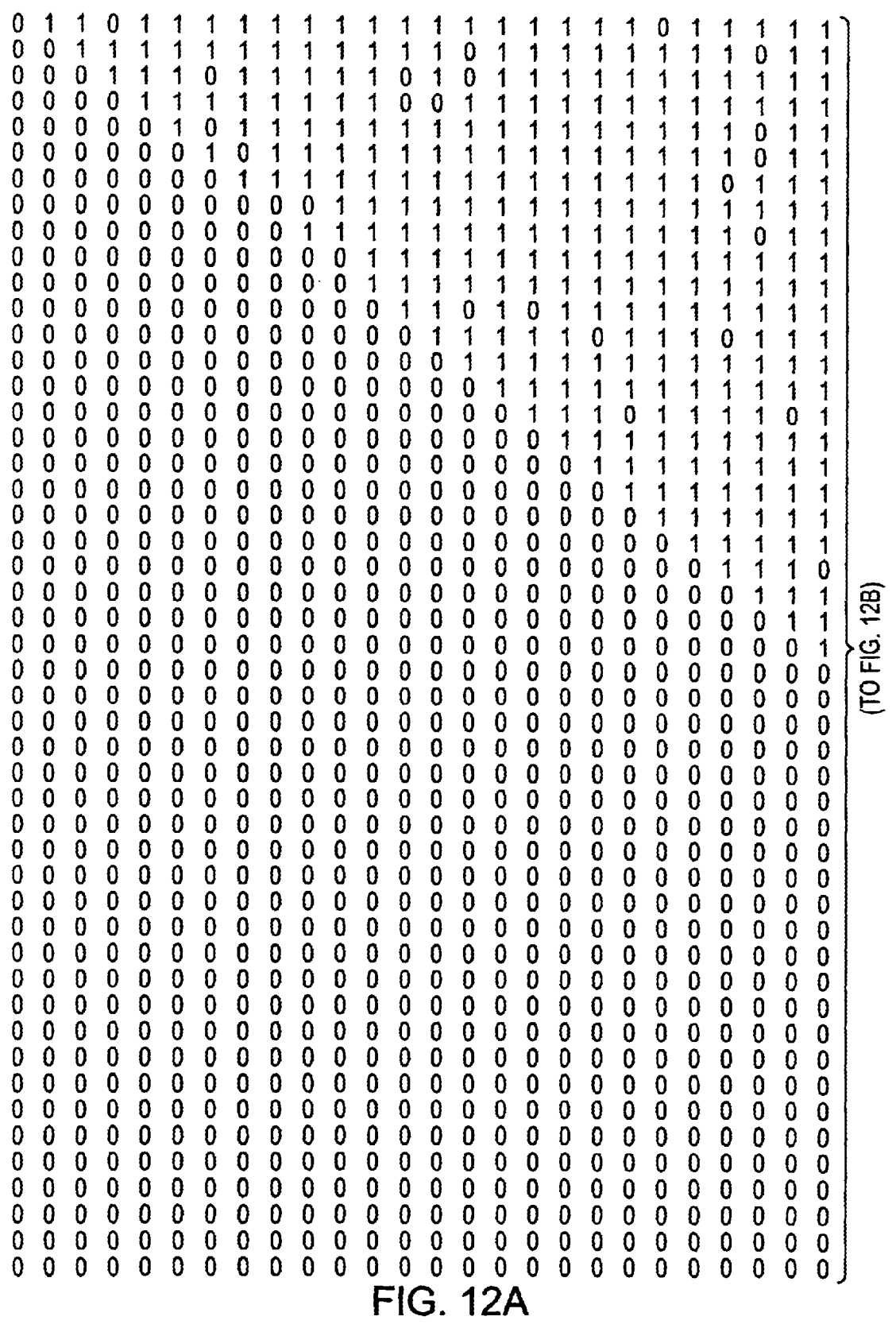
Figure 12B:
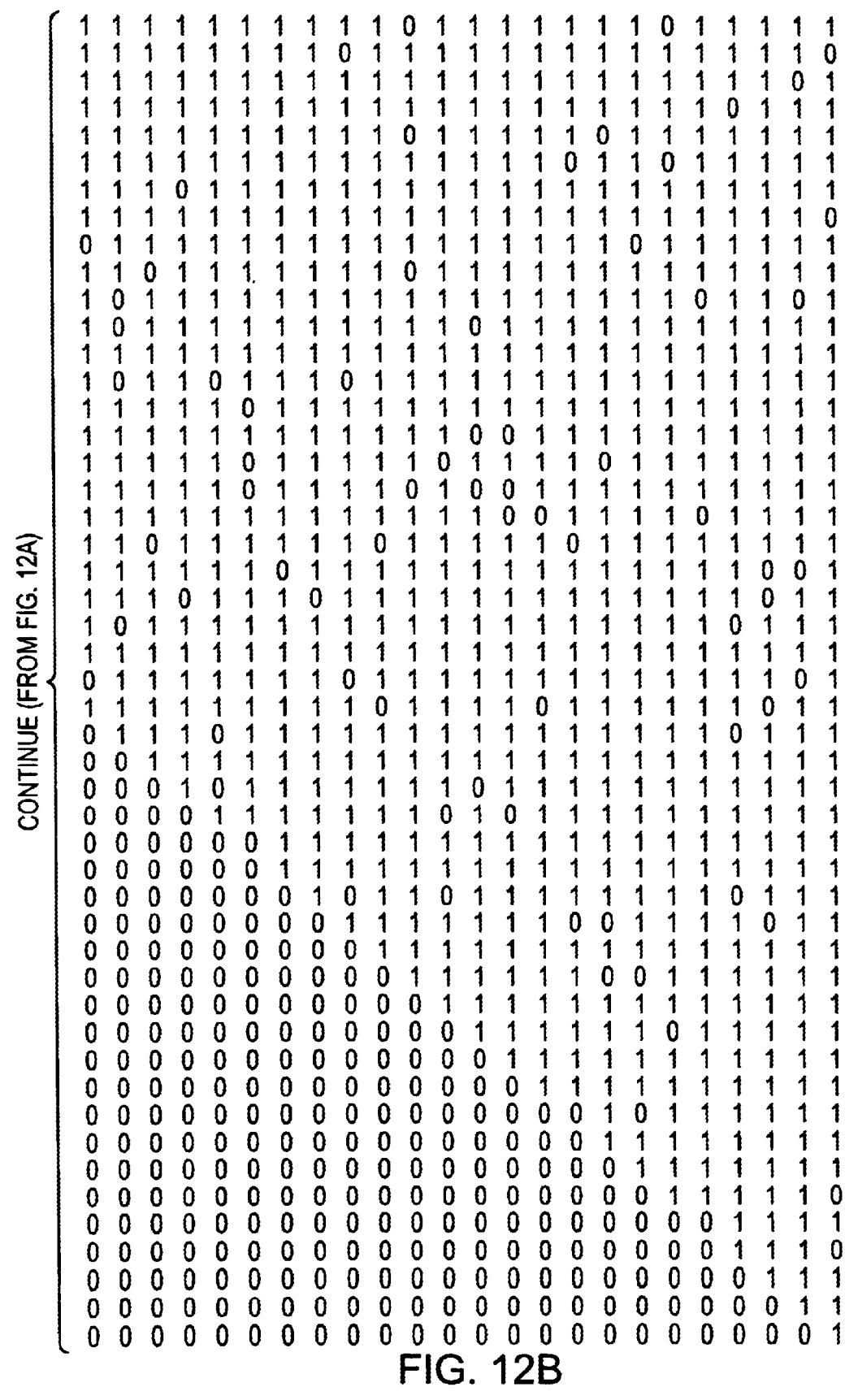

The graph of 50 nodes is given by a weights matrix. The edges belonging to the graph are of zero weight; those, complemented to be strongly connected, have the weight equal to 1. The graph is given with the help of the generator of random numbers (with the fixed maximum values of its nodes' degree equal to 4). The weights of the graph are given in the table of FIG. 12.

It is required for the graph given to:

find if a Hamiltonian cycle exists in it (if yes, what is);
find if other Hamiltonian cycles exist.
Found:
The cycle in the graph:
1-21-48-26-41-44-36-43-17-38-30-22-34-42-6-45-46-19-40-18 -32-31-29-20-16-39-12-15-2-50-8-9-24-5-7-3-49-25-27-47-33 -35-14-4-13-23-28-11-10-37-1;

In the graph there exist other Hamiltonian cycles;
the computer running time: less than 0.075 sec.

Example 4

The computer system of FIG. 1 is configured to solve a Hamiltonian cycle in graph type problem. Processor 12 is provided by a Intel® Pentium Pro® processor having 200 MHZ, 512 KB cache and 64 MB RAM.

Using the random digits generator there were realized graphs; for each of five values of the total number of graph nodes N+25, 50, 100, 200 and 400 there were realized 50 random graphs. Then for each of these graphs, there was solved the problem of existence of the Hamiltonian cycle in the graph, using the method according to the invention. In the following table for each of five values N there is given the maximal (across the ensemble of 50 realizations) duration of computer time t, spent for the corresponding problem solution:

| N | 25 | 50 | 100 | 200 | 400 |
|---|---|---|---|---|---|
| t, sec | 0.546 | 5.77 | 56.8 | 422 | 3445 |

All of the maximal time values were realized in the cases where the graph lacked the Hamiltonian cycle. If the Hamiltonian cycle was available, the time spent for computations was much shorter.

Example 5

To solve the Traveling Salesman problem the computer is designed as shown in FIG. 1. The Intel® Pentium Pro® processor, 200 MHZ, 512 KB cache and 64 MB RAM is used.

Using the random digits generator there were realized the networks; for the values of the total number of network nodes N+25, 50, 100 and 150. The maximal deviation of weights of the edges in these networks $\xi$ was +−5, +−100 or +−500. For each value of $\xi$ and for each of N=25 and 50 there were realized 50 networks; for each value of $\xi$ and for each of N=100 and 150 there were realized 10 networks.

Then for each of these networks there was solved the Traveling Salesman problem, using the method according to the invention. In the following table for each of values of N and for $\xi$ there is given the average (across the ensemble of 50 (10) realizations) duration of computing time t, spent for the corresponding problem solution:

| N | 25 | | | 50 | | |
|---|---|---|---|---|---|---|
| $\xi$ | 5 | 100 | 500 | 5 | 100 | 500 |
| t, sec | 1.866 | 2.286 | 2.405 | 29.03 | 38.27 | 40.93 |
| | 100 | | | 150 | | |
| | 5 | 100 | 500 | 5 | 100 | 500 |
| | 649.5 | 836.4 | 1038 | 1781 | 3528 | 4072 |

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A computer-implemented method in support of solving an NP-complete-type problem, said method comprising the steps of:

recording in a memory of said computer a primary network having N nodes represented by a matrix of edge weights;

forming an equivalent representation of said primary network as a set of N subnetworks, wherein each of said N subnetworks has a like number of nodes and all edges incident to one node of each of said N subnetworks have zero weight;

improving a present path by application of reordering rule means for reordering nodes of said subnetworks successively utilizing data from each of said N subnetworks until for a complete cycle of application of data from each of said N subnetworks to said reordering rule means, no subnetwork is reordered;

transforming by application of edge weight changing rule means for changing weights of edges of said subnetworks successively utilizing data from each of said N subnetworks until for a complete cycle of application of data from each of said N subnetworks to said edge weight changing rule means, no edge weight is changed; and repeating said improving and transforming steps until said path cannot be reordered by application of said reordering rule means, and said edge weights cannot be changed by application of said edge weight changing rule means.

2. The method of claim 1, wherein said reordering rule means includes means for comparing a weight of a connecting edge connecting a certain node of said path to an edge weight of non-incident edges of said path.

3. The method of claim 1, wherein said reordering rule means includes:

comparing means for comparing a weight of a connecting edge connecting a connected node of said path to edge weights of non-incident edges of said path; and means responsive to said comparing means for interposing said connected node between nodes of said path incident to an edge having greater weight than a weight of said connecting edge.

4. The method of claim 1, wherein said edge weight changing rule means includes testing means for testing whether a connecting edge of said path has greater or equal weight than weights of remaining non-incident edges of said path.

5. The method of claim 1, wherein said edge weight changing rule means includes:

testing means for testing whether a connecting edge of said path has greater or equal weight than weights of remaining non-incident edges of said path; and means responsive to said testing means for reducing weights of certain edges of said set of subnetworks.

6. The method of claim 1, wherein said method further includes the step of storing said present path as a minimal Hamiltonian path when said path cannot be changed by application of said reordering rule means, and said edge weights cannot be reduced by application of said edge weight changing rule means.

7. The method of claim 1, wherein said method further includes the step of storing a cycle associated with said present path as a minimal Hamiltonian cycle when said path cannot be reordered by application of said reordering rule means, and said edge weights cannot be changed by application of said edge weight changing rule means.

8. The method of claim 1, wherein a first execution of said improving step occurs prior to a first execution of said transforming step.

9. The method of claim 1, wherein a first execution of said transforming step occurs prior to a first execution of said improving step.

10. The method of claim 1, wherein said forming step includes application of equivalent subnetwork formation rule means utilizing said edge weights of said primary network.

11. The method of claim 1, wherein said edge weights of said primary network have binary values.

12. The method of claim 1, wherein said edge weights of said primary network have nonbinary values.

13. The method of claim 1, wherein said edge weights of said primary network have nonbinary positive and negative values.

14. The method of claim 1, wherein said edge weights represent distances between locations.

15. The method of claim 1, wherein said primary network is designed to model motion of a machine tool.

16. A computer system in support of solving an NP-complete-type problem, said computer system comprising:

recording means recording in a memory of said computer system a primary network having N nodes represented by a matrix of edge weights;

forming means forming an equivalent representation of said primary network as a set of N subnetworks, wherein each of said N subnetworks has a like number of nodes and all edges incident to one node of each of said N subnetworks have zero weight;

improving means improving a present path by application of reordering rule means for reordering nodes of said subnetworks successively utilizing data from each of said N subnetworks until for a complete cycle of application of data from each of said N subnetworks to said reordering rule means, no subnetwork is reordered;

transforming means transforming by application of edge weight changing rule means for changing weights of edges of said subnetworks successively utilizing data from each of said N subnetworks until for a complete cycle of application of data from each of said N subnetworks to said edge weight changing rule means, no edge weight is changed; and repeating means repeating application of said reordering rule means and said edge weight changing rule means until said path cannot be reordered by application of said reordering rule means, and said edge weights cannot be changed by application of said edge weight changing rule means.

17. The computer system of claim 16, wherein said reordering rule means includes means for comparing a weight of a connecting edge connecting a certain node of said path to an edge weight of non-incident edges of said path.

18. The computer system of claim 16, wherein said reordering rule means includes:

comparing means for comparing a weight of a connecting edge connecting a connected node of said path to edge weights of non-incident edges of said path; and means responsive to said comparing means for interposing said connected node between nodes of said path incident to an edge having greater weight than a weight of said connecting edge.

19. The computer system of claim 16, wherein said edge weight changing rule means includes testing means for testing whether a connecting edge of said path has greater or equal weight than weights of remaining non-incident edges of said path.

20. The computer system of claim 16, wherein said edge weight changing rule means includes:

testing means for testing whether a connecting edge of said path has greater or equal weight than weights of remaining non-incident edges of said path; and means responsive to said testing means for reducing weights of certain edges of said set of subnetworks.

21. The computer system of claim 16, wherein said computer system further includes means for storing said present path as a minimal Hamiltonian path when said path cannot be reordered by application of said reordering rule means, and said edge weights cannot be changed by application of said edge weight changing rule means.

22. The computer system of claim 16, wherein said computer system further includes the step of storing a cycle associated with said present path as a minimal Hamiltonian cycle when said path cannot be reordered by application of said reordering rule means, and said edge weights cannot be changed by application of said edge weight changing rule means.

23. The computer system of claim 16, wherein a first execution of said improving means occurs prior to a first execution of said transforming means.

24. The computer system of claim 16, wherein a first execution of said transforming means occurs prior to a first execution of said improving means.

25. The computer system of claim 16, wherein said forming means applies equivalent subnetwork formation rules to said primary network.

26. The computer system of claim 16, wherein said edge weights of said primary network have binary values.

27. The computer system of claim 16, wherein said edge weights of said primary network have nonbinary values.

28. The computer system of claim 16, wherein said edge weights of said primary network have nonbinary positive and negative values.

29. The computer system of claim 16, wherein said edge weights represent distances between locations.

30. The computer system of claim 16, wherein said primary network is designed to model motion of a machine tool.

31. A memory device including a program for execution by a computer system, wherein said program configures said computer system to:
  record in a memory of said computer system a primary network having N nodes represented by a matrix of edge weights;
  form an equivalent representation of said primary network as a set of N subnetworks, wherein each of said N subnetworks has a like number of nodes and all edges incident to one node of each of said N subnetworks have zero weight;
  improve a present path by application of reordering rule means for reordering nodes of said subnetworks successively utilizing data from each of said N subnetworks until for a complete cycle of application of data from each of said N subnetworks to said reordering rule means, no subnetwork is reordered;
  transform by application of edge weight changing rule means for changing weights of edges of said subnetworks successively utilizing data from each of said N subnetworks until for a complete cycle of application of data from each of said N subnetworks to said edge weight changing rule means, no edge weight is changed; and
  repeat application of said reordering rule means and said edge weight changing rule means until said path cannot be reordered by application of said reordering rule means, and said edge weights cannot be changed by application of said edge weight changing rule means.

32. The memory device of claim 31, wherein said reordering rule means includes means for comparing a weight of a connecting edge connecting a certain node of said path to an edge weight of non-incident edges of said path.

33. The memory device of claim 31, wherein said reordering rule means includes:
  comparing means for comparing a weight of a connecting edge connecting a connected node of said path to edge weights of non-incident edges of said path; and
  means responsive to said comparing means for interposing said connected node between nodes of said path incident to an edge having greater weight than a weight of said connecting edge.

34. The memory device of claim 31, wherein said edge weight changing rule means includes testing means for testing whether a connecting edge of said path has greater or equal weight than weights of non-incident edges of said path.

35. The memory device of claim 31, wherein said edge weight changing rule means includes:
  testing means for testing whether a connecting edge of said path has greater or equal weight than weights of non-incident edges of said path; and
  means responsive to said testing means for reducing weights of certain edges of said set of subnetworks.

36. The memory device of claim 31, wherein said program of said memory device further configures said computer system to store said present path as a minimal Hamiltonian path when said path cannot be reordered by application of said reordering rule means, and said edge weights cannot be changed by application of said edge weight changing rule means.

37. The memory device of claim 31, wherein said program of said memory device further configures said computer system to store a cycle associated with said present path as a minimal Hamiltonian cycle when said path cannot be reordered by application of said reordering rule means, and said edge weights cannot be changed by application of said edge weight changing rule means.

38. The memory device of claim 31, wherein said program configures said computer system so that a first application of said reordering rule means is prior to a first application of said edge weight changing rule means.

39. The memory device of claim 31, wherein said program configures said computer system so that a first application of said edge weight changing rule means is prior to a first application of said reordering rule means.

40. The memory device of claim 31, wherein said program configures said computer system to apply equivalent subnetwork formation rule means utilizing said edge weights of said primary network.

41. The memory device of claim 31, wherein said program configures said computer system so that said edge weights of said primary network have binary values.

42. The memory device of claim 31, wherein said program configures said computer system so that said edge weights of said primary network have nonbinary values.

43. The memory device of claim 31, wherein said program configures said computer system so that said edge weights of said primary network have nonbinary positive and negative values.

44. The memory device of claim 31, wherein said program configures said computer system so that said edge weights represent distances between locations.

45. The memory device of claim 31, wherein said program configures said computer system so that said primary network is designed to model motion of a machine tool.

46. The memory device of claim 31, wherein said memory device is transportable.

47. The memory device of claim 31, wherein said memory device is a floppy disk.

48. The memory device of claim 31, wherein said memory device is a compact disk.

* * * * *